(12) United States Patent
Holland et al.

(10) Patent No.: US 9,377,586 B2
(45) Date of Patent: Jun. 28, 2016

(54) NA REDUCTION IN FIBER OPTICAL COUPLERS

(75) Inventors: William R. Holland, Upper Black Eddy, PA (US); William J. Strachan, Hillsborough, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 13/823,473

(22) PCT Filed: Sep. 21, 2011

(86) PCT No.: PCT/US2011/052669
§ 371 (c)(1),
(2), (4) Date: Apr. 22, 2013

(87) PCT Pub. No.: WO2012/040405
PCT Pub. Date: Mar. 29, 2012

(65) Prior Publication Data
US 2013/0322819 A1    Dec. 5, 2013

Related U.S. Application Data

(60) Provisional application No. 61/384,959, filed on Sep. 21, 2010.

(51) Int. Cl.
*G02B 6/26* (2006.01)
*G02B 6/24* (2006.01)
*G02B 6/28* (2006.01)

(52) U.S. Cl.
CPC ........ *G02B 6/262* (2013.01); *G02B 6/24* (2013.01); *G02B 6/2835* (2013.01)

(58) Field of Classification Search
None
See application file for complete search history.

(56) References Cited

U.S. PATENT DOCUMENTS

| | | | | |
|---|---|---|---|---|
| 3,912,362 A | * | 10/1975 | Hudson | G02B 6/403 385/115 |
| 3,933,455 A | * | 1/1976 | Chown | G02B 6/4203 385/115 |
| 4,179,185 A | * | 12/1979 | Hawk | G02B 6/2856 385/43 |
| 5,138,677 A | * | 8/1992 | O'Shaughnessy et al. | G02B 6/2808 250/227.11 |
| 6,272,155 B1 | | 8/2001 | Sekiguchi | |
| 6,467,969 B1 | * | 10/2002 | Shmulovich | G02B 6/245 385/49 |
| 7,419,308 B2 | * | 9/2008 | Ma | G02B 6/25 385/115 |
| 2001/0031115 A1 | * | 10/2001 | Chen et al. | G02B 6/262 385/54 |
| 2002/0054740 A1 | * | 5/2002 | Vakili et al. | G02B 6/14 385/115 |
| 2006/0093290 A1 | * | 5/2006 | Fishteyn | C03C 25/68 385/115 |
| 2009/0154881 A1 | | 6/2009 | Salokatve | |
| 2014/0119694 A1 | * | 5/2014 | Abedin et al. | G02B 6/02042 385/43 |

* cited by examiner

*Primary Examiner* — Mike Stahl
(74) *Attorney, Agent, or Firm* — Wendy Kobe, Esq.

(57) ABSTRACT

A fiber optical coupler comprises a bundle of optical fibers configured to couple light from a multiplicity of input light sources to an output port, each of the fibers comprising a multimode fiber having a core region and a cladding region surrounding the core region. The bundle has first and second axial sections arranged in tandem and adiabatically coupled to one another via a transition zone that includes an optical interface. Within the first section, the ratio of the cross-sectional core area of each of at least some of the fibers to the total cross-sectional area of each of those fibers is given by $R_1$, and within the second section, the ratio of the cross-sectional core area of each of at least some of the fibers to the total cross-sectional area of each of those fibers is given by $R_2 > R_1$, where $R_2$ is substantially constant along the axial length of the second section. In one embodiment, the second section is tapered from a larger diameter at the optical interface to a smaller diameter at the output port. Methods of making such optical couplers are also described.

18 Claims, 4 Drawing Sheets

NA REDUCTION IN FIBER OPTICAL COUPLERS

CROSS-REFERENCE TO RELATED APPLICATIONS

This application claims the benefit of U.S. Provisional Application 61/384,959, filed Sep. 21, 2010, which is incorporated herein by reference.

BACKGROUND OF THE INVENTION

1. Field of the Invention

This invention relates to optical couplers, and, more particularly, to reducing the increase of numeric aperture (NA) in fiber optical couplers, including tapered-fiber-bundle (TFB) optical couplers.

2. Discussion of the Related Art

Applications that utilize high power light (optical) sources are diverse, ranging from machining and welding to pumping optical amplifiers and lasers. In these applications, a tapered fiber bundle (TFB) optical coupler is often used to couple multiple light inputs from multiple light sources into a single optical output port. [See, for example, DiGiovanni & Stentz, U.S. Pat. No. 5,864,644 (1999) and DiGiovanni & Tipton, U.S. Pat. No. 5,935,288 (1999), both of which are incorporated herein by reference.]

Figure 1:
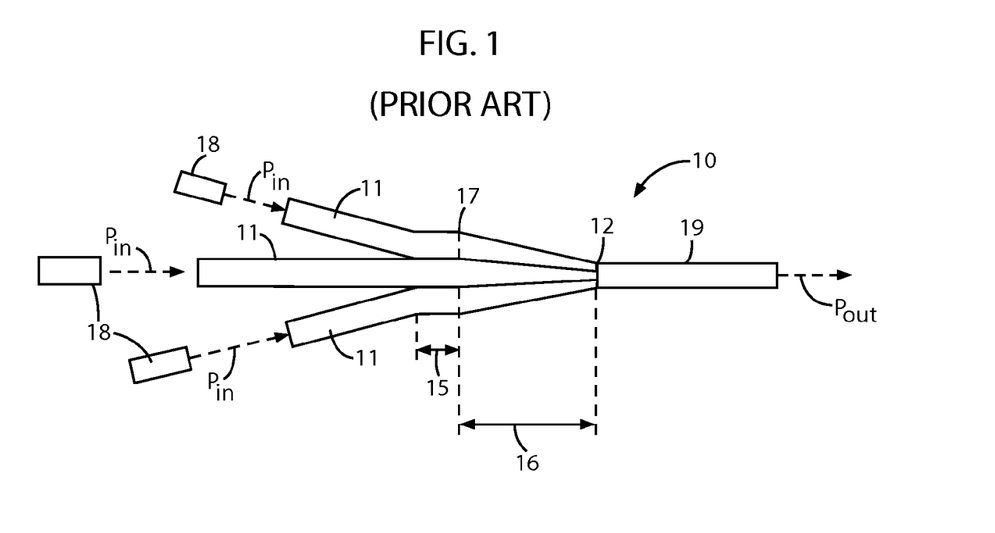
FIG. 1 is a schematic, partially cross-sectional view of a conventional TFB optical fiber coupler according to the prior art.
Figures 2, 2A, 2B, 2C, 2D:
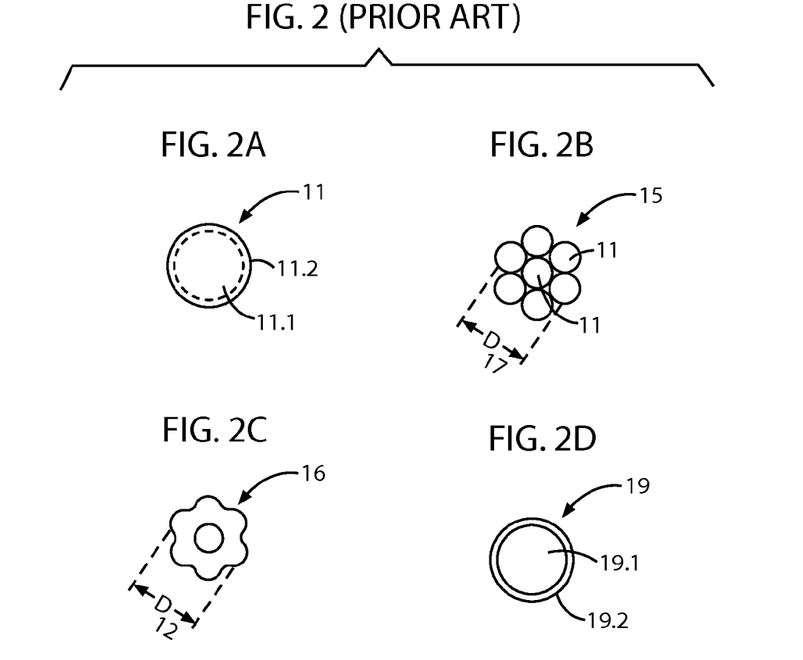
FIG. 2 shows schematically various cross-sections of the fibers of the TFB coupler of FIG. 1.
FIG. 2A depicts a multimode input fiber 11 having a core region 11.1 surrounded by a cladding region 11.2.
FIG. 2B depicts a bundle of fibers 11 at interface 17 of untapered first section 15.
FIG. 2C depicts a bundle of fibers at interface 12 of second section 16 after they have been tapered and fused.
FIG. 2D depicts an output fiber 19, such as a large-mode-area (LMA) fiber, having a core region 19.1 surrounded by a cladding region 19.2. The schematic nature of FIG. 2 includes the following: (i) in the bundle of FIG. 2B, only the outer boundary of each of the bundled fibers 11 is shown (i.e., for simplicity the details of the core and cladding regions have been omitted), and in the bundle of FIG. 2C, the corresponding details of the tapered and fused fibers have also been omitted. In a practical TFB utilizing illustratively seven multimode fibers, FIG. 2C herein would be akin to FIG. 6 of U.S. Pat. No. 5,935,288, supra. In some embodiments, the TFB may include more than seven fibers (e.g., nineteen or more)

A schematic of a conventional TFB optical coupler 10 is shown in FIG. 1. A multiplicity of input fibers 11 (as shown in FIGS. 2A, 2B) couples input light $P_{in}$ from a multiplicity of light sources 18 into TFB 10, which couples the combined light inputs to output port 12 and, optionally, to an output fiber 19 (FIG. 2D) spliced to output port 12. [For simplicity input light is shown entering only three input fibers 11 in FIG. 1, but, in practice, it is common to use more input in practice light typically is inputted to more fibers; e.g., seven (FIG. 2B) or nineteen (not shown). In addition, in typical prior art TFB configuration the fibers are bundled, with a central fiber being a single-mode signal fiber surrounding fibers being multimode pump fibers.]

As shown in FIG. 1, in a first section 15 the fibers 11 are bundled together and fused to one another, and light propagates separately in each fiber 11. In a second section 16, disposed in tandem with first section 15, the fibers 11 are not only bundled and fused (as in first section 15) but also tapered from a larger (maximum) equivalent diameter $D_{17}$ (as shown in FIG. 2B) at interface 17 to a smaller (minimum) equivalent diameter $D_{12}$ (as shown in FIG. 2C) at interface (output port) 12. The equivalent diameter is given by:

$$D_{eq} = D_{fiber}\sqrt{n} \quad (1)$$

where n is the fiber of fibers in the bundle, and $D_{fiber}$ is the diameter of an individual fiber. This formula assumes all of the fibers within the bundle have the same diameter. The ratio of the maximum equivalent diameter ($D_{17}$) of the bundled, untapered fibers (FIG. 2B) to the minimum equivalent diameter ($D_{12}$) of the bundled, tapered fibers (FIG. 2C) is known as the tapered-down-ratio (TDR), which is given by:

$$D_{17}/D_{12} = TDR. \quad (2)$$

Phrased another way, the TDR is simply related to the cross-section areas $A_{17}$, $A_{12}$ at interfaces 17 and 12, respectively, as follows:

$$(A_{17}/A_{12})^{0.5} = TDR. \quad (3)$$

The TDR typically has a value in the range of approximately 2 to 3. In second section 16, light is confined to a smaller cross-sectional area and will remain confined in the separate fibers only as long as the NA of the propagating light does not exceed that of the fiber waveguide. Thus, some portion of the light will spread among the fibers, at some point along the tapered second section 16. Therefore, the NA of light at the output port 12 is higher than at interface 17.

In some applications (e.g., optical amplifiers and lasers), one end of the output fiber 19 may, for example, be fusion spliced to second section 16 at interface 12, and the other end may be fusion spliced to a gain-producing fiber (GPF; not shown). The light output of the output fiber 19 is designated $P_{out}$. On the other hand, in other high power applications, such as cutting and welding, the high power light output of output fiber 19 may be applied directly to a work piece to be cut or welded.

One problem with conventional TFB couplers is that the tapering process increases the NA of the light at the output face 12 (as noted above), which, in turn, means that light rays emerging from output face 12 diverge more, which makes coupling into other devices (e.g., into output fiber 19) more difficult and less efficient. Although in an ideal TFB brightness would be conserved between the input and output, the numerical aperture of the light is still increased, which is undesirable for many applications.

Thus, there is a need in the art for a TFB optical coupler that minimizes the NA increase as light passes through it as compared to prior art TFB couplers of the type described with reference to FIGS. 1 and 2.

BRIEF SUMMARY OF THE INVENTION

In accordance with a first aspect of our invention, a fiber optical coupler comprises a plurality of optical fibers, either single mode, multimode, or a combination of both, configured to couple light from a plurality of input light sources to an output port, with at least one of the fibers having a core region and a cladding region surrounding the core region. The bundle has first and second axial sections arranged in tandem, wherein the at least one core region of the fibers in the first axial section has a diameter, $D_{core1}$ and the surrounding cladding region has a diameter $D_{clad1}$, and cross-sectional area $A_{clad1}$, and the at least one core region of the fibers in the second axial section has a diameter $D_{core2}$, and the surrounding cladding region has a diameter $D_{clad2}$ and cross-sectional area $A_{clad2}$, such that $D_{clad1} > D_{clad2}$ or more generally $A_{clad1} > A_{clad2}$. According to one embodiment, the cores of the fibers in the first section may match the cores of the fibers in the second section, such that $D_{core1} = D_{core2}$. However, other embodiments encompass using cores of different sizes between the fibers of the first and second sections, such that $D_{core1} \neq D_{core2}$.

In one embodiment the fibers of the first axial section are separate fibers from the fibers in the second axial section, and each fiber of the first axial section are each optically coupled at an output end to an input end of each of the fibers in the second section, thereby creating an optical interface such that the cores of each of the fibers of the first section are aligned with the cores of each of the fibers of the second section. The optical coupling may be performed by any known technique, for example, by splicing or use of a mechanical connector. The fibers of the second section have a reduced cladding thickness such that $D_{clad1} > D_{clad2}$ or more generally $A_{clad1} > A_{clad2}$.

In another embodiment, the second section is created from the same fibers in the first axial section by removing a portion of the cladding from a length of each of the fibers (typically, though not necessarily, the same length for each fiber), thereby reducing the cladding thickness and diameter to achieve $A_{clad1} > A_{clad2}$. The reduction of the cladding may be performed by mechanical or chemical means, such as the use of hydrofluoric acid. [See, for example, Fishteyn, U.S. Pat. No. 7,209,615, which is incorporated herein by reference].

A length of the second axial section then is tapered down to a smaller diameter at the output port, such that both $D_{core2}$ and $D_{clad2}$ are reduced, thereby creating a tapered section. This tapered section could be less than the entire length of the second axial section, such that tapering would begin at a distance away from the interface between the first and second axial sections. Alternately, the entire length of the second axial section could be tapered. One aspect of the invention includes bundling the fibers of the second section prior to being tapered.

Although the tapering step still generates an increase in the NA at the output port of the coupler, the reduced cladding diameter increases the core to cladding diameter ratio in the tapered section (within a part or all of the second axial section), which can be employed to reduce the taper ratio and/or reduce the increase in the NA of an output optical light or signal compared to the NA increase typically generated by prior art TFBs and tapering methods, such as those shown in FIGS. 1 and 2. Thus, brightness is increased in the TFB coupler relative to the prior art, which leads to an increase in overall performance.

In yet another embodiment of the first aspect of our invention, within fibers of the second section, the reduced cladding fiber regions reduce the confinement of light therein, which can allow the light to leak, depending on the thickness of the cladding, especially if the cladding is removed entirely from each fiber in the second section. To counter this phenomenon, the plurality of fibers in the second section may be enclosed by an "overclad" tube prior to tapering. Additionally, the overclad tube can assist in light confinement when the cladding regions in the second section become thin enough during tapering such that light may leak. In either instance, the refractive index of the overclad tube must be lower than that of either the cladding regions or the core regions covered, even after tapering. Alternately, one or more of the plurality of fibers in the second section may be encased in a low index rod to counter the potential reduced confinement of light.

In accordance with a second aspect of our invention, a method of fabricating a tapered fiber optical coupler comprises the steps of:

(a) providing a plurality of optical fibers; at least one of said fibers having a core region and an annular cladding region surrounding the core region, wherein the at least one core region of the fibers in the first axial section has a diameter, $D_{core1}$ and the surrounding cladding region has a diameter $D_{clad1}$, and at least one core region of the fibers in the second axial section has a diameter $D_{core2}$, and the surrounding cladding region has a diameter $D_{clad2}$, (b) arranging the fibers in a bundle, the bundle having first and second axial sections arranged in tandem with one another, (c) configuring the fibers of the first and second sections to reduce the cladding of the fibers in the second section such that $D_{clad1} > D_{clad2}$ and more generally $A_{clad1} > A_{clad2}$; and (d) tapering a portion of the second section of fibers. In one aspect of this embodiment, the tapered portion is less than the entire length of the second section. In another aspect, the tapered portion is the entire length of the second section.

The method may further comprise the step of fusing the fibers therein to one another. In another embodiment, the method includes the step of heating, without tapering, the fibers of the second section.

In another embodiment of the invention, the fibers of the first and second sections are continuous with no optical discontinuity (e.g., splice) therebetween, and in step (c) the cladding thickness is reduced by mechanically or chemically removing a portion of the cladding of at least one of the fibers of the second region.

In yet another embodiment of the invention, in steps (a) and (b) the plurality of fibers comprises a first group of fibers having a first thickness of their cladding regions and a second group of fibers having a second, smaller thickness of their cladding regions. Initially the fibers of the first group are aligned with and spliced to the fibers of the second group. Once spliced, the fibers are arranged in two bundles, with the fibers of one bundle forming the first section, and the fibers of the other bundle forming the second section. The fibers of the second section are then tapered.

BRIEF DESCRIPTION OF THE SEVERAL VIEWS OF THE DRAWING

Our invention, together with its various features and advantages, can be readily understood from the following more detailed description taken in conjunction with the accompanying drawing, in which:

FIGS. 3A-E depict a TFB coupler in accordance with an embodiment of the present invention, and specifically.

Various ones of the foregoing figures are shown schematically in that they are not drawn to scale and/or, in the interests of simplicity and clarity of illustration, do not include all of the details of an actual optical fiber or product depicted.

DETAILED DESCRIPTION OF THE INVENTION

Glossary

Brightness:

The brightness of a light beam source is defined as the power (P) per unit mode area at the beam focus per unit solid angle of divergence in the farfield. It is measured in units of W/(sr cm$^2$). For more detail see, for example, "Encyclopedia of Laser Physics and Technology," which can be found on the internet at URL http://www.rp-photonics.com/brightness.html and is incorporated herein by reference. Brightness can be represented as power divided by the etendue, which is a function of the area of the source and the solid angle into which the light propagates. For simple systems, etendue can be approximated by $\pi \cdot S \cdot NA^2$, where S is the source area.

Consider a conventional low brightness laser diode array that delivers light to a GPF by means of a fiber pigtail with a core of diameter d and numerical aperture NA. Typical commercially available laser diode arrays deliver roughly 10 W-25 W of power into a pigtail core of 105 µm diameter and 0.15 to 0.22 NA (etendue of roughly $1.3 \times 10^3$ sr µm$^2$), which means that the output beam has a brightness of about 7.6 mW/(sr µm$^2$). By high brightness we mean that the brightness of our pump source is at least 30 times greater than that of a conventional low brightness laser diode array; preferably 100 times greater. Therefore, illustratively our high brightness pump source would deliver to GPF 12 at least 760 mW/(sr µm$^2$).

Center Wavelength:

Throughout this discussion references made to wavelength are intended to mean the center wavelength of a particular light emission, it being understood that all such emissions have a characteristic linewidth that includes a well-known range of wavelengths above and below the center wavelength.

Glass Fiber:

Optical fiber of the type described herein is typically made of glass (e.g., silica) in which the refractive indices of the cladding regions are controlled by the amount and type of one or more dopants (e.g., P, Al, Ge, F, B) or by low-index hollow voids (e.g., airholes) incorporated therein during the fabrication of the fiber, as is well known in the art. These refractive indices, as well as the thicknesses/diameters of core/cladding regions, determine important operating parameters, as is also well known in the art. For multimode pump fibers in particular, the core is typically "pure" silica; that is, the core material is undoped silica, whereas the cladding is typically silica down-doped with Fluorine.

Index:

The terms index and indices shall mean refractive index and refractive indices.

Mode:

The term mode(s) shall mean the transverse mode(s) of an electromagnetic wave (e.g., signal light). In addition, the term fundamental mode of an optical fiber generally refers to the $LP_{01}$ mode.

Radius/Diameter:

Although the use of the terms radius and diameter in the foregoing (and following) discussion implies that the cross-sections of the various regions (e.g., core, pedestal, trench, cladding) are circular and/or annular, in practice these regions may be non-circular; for example, they may be elliptical, polygonal, irregular or other more complex shapes. Nevertheless, as is common in the art, we frequently use the terms radius and/or diameter for simplicity and clarity.

Undoped:

The term undoped or unintentionally doped means that a region of a fiber, or a starting tube used to form such a region, contains a dopant not intentionally added to the region during fabrication, but the term does not exclude low levels of background doping that may be inherently incorporated during the fabrication process. Such background doping levels are low in that they have an insignificant effect on the refractive index of the undoped region.

Tapered Fiber Bundle—Design

Under this heading we describe various embodiments of our fiber optical coupler in which the second section of the bundled fibers is tapered; that is, they are TFB coupler designs modified in accordance with our invention. However, as mentioned previously and discussed in greater detail below, in some embodiments of our invention tapering is not essential.

In accordance with one embodiment of a first aspect of our invention, a conventional TFB optical coupler 10, as shown in FIG. 1, is modified in order to reduce the NA increase of the light emerging from the output port at interface 12. Conventional TFB optical coupler 10 was described previously, but for clarity we briefly repeat that coupler 10 comprises a bundle of optical fibers 11, either single mode or multimode, configured to couple light from a multiplicity of input light sources 18 to an output port 12, with one or more of the fibers 11 having a core region 11.1 and a cladding region 11.2 surrounding the core region, as shown in FIG. 2A, as an example, for a multimode fiber. The bundle has first and second axial sections 15 and 16, respectively, arranged in tandem and coupled to one another via an axial transition zone (not shown) that includes optical interface 17. The fibers within the second section 16 are tapered from a larger cross-sectional bundle at the interface 17 to a smaller cross-sectional bundle at the output port 12. [The identification of an interface 17 is a matter of pedagogical convenience; i.e., fibers 11 are continuous between section 15 and section 16; that is, there no optical discontinuity at interface 17.

As an example, TFB coupler 10 can be made with seven fibers 11 bundled as shown in FIG. 2B. Each fiber 11 in section 15 typically has core region 11.1 with a diameter of 105 µm and cladding region 11.2 with an outside diameter of 125 µm, which means the maximum outside diameter of the bundle in first section 15 is $D_{15}$=375 µm. In order to pull (or draw) down the bundle to a diameter of 125 µm=$D_{12}$ at interface 12 of the second section 16, the required $TDR_{conv}$ for this conventional TFB coupler is given by $$TDR_{conv}=125 \text{ µm} \times (7)^{1/2}/125 \text{ µm}=2.65 \quad (4)$$

In this exemplary TFB coupler, the NA of light at output port 12 would be increased by the same factor; that is, by 2.65.

Figure 3A:
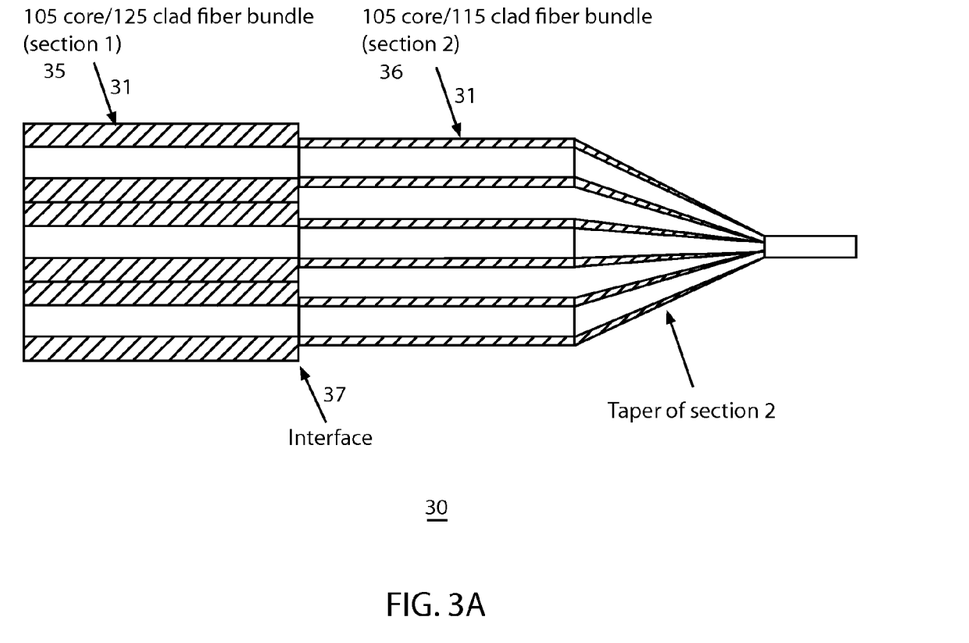

In contrast, consider a second example TFB coupler 30, as shown in FIG. 3A, configured in accordance with an illustrative embodiment of our invention. For comparison purposes, the inventive TFB coupler would also be made with seven fibers 31 bundled as shown in FIG. 2B. Each fiber 31 in the first section 35 illustratively has a core region 31.1 with a diameter of 105 µm and a cladding region 31.2 with an outside diameter of 125 µm. In comparison to FIGS. 1 and 2, each fiber 31 in second section 36 also has core region 31.1 with a diameter of 105 µm, but cladding region 31.2 is thinner, having an outside diameter of only 116 µm. Consequently, the maximum outside diameter of the bundle in first section 35 (at interface 37) is again $D_{15}$=375 µm, but the maximum outside diameter of the bundle in the second section, (at interface 37), is $D_{15}$=348 µm. In order to pull (or draw) down the bundle of the second section 16 to an outside diameter of 125 μm=$D_{12}$ at interface 12, the required $TDR_{inv}$ for this inventive TFB coupler is given by $$TDR_{inv}=116 \text{ μm} \times (7)^{1/2}/125 \text{ μm}=2.45 \quad (5)$$

Thus, the NA of this embodiment of our inventive coupler would increase by a factor of only 2.45 (compared to a factor of 2.65 for the above first illustrative TFB), which means that the brightness of the light emerging from output port 12 would be commensurately increased by a factor of approximately 17% [i.e., $(2.65/2.45)^2=1.17$]. As seen between FIG. 1 and FIG. 3, this modification allows for a smaller TDR, which has two advantages: (i) the tapered second section 36 doesn't have to be pulled as much in length to produce a desired diameter at the output port 12 and (ii) the NA doesn't increase as much as a result.

Figure 3B:
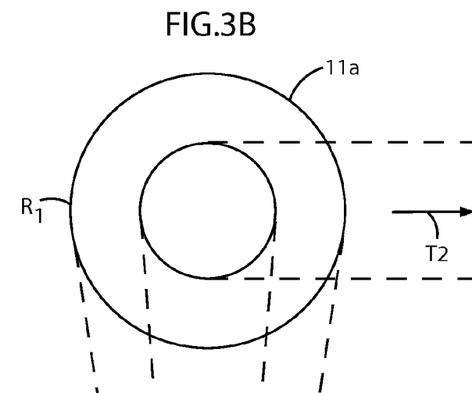
FIGS. 3B-E show schematic cross-sections of optical fibers contrasting the TFB coupler fabrication process of the prior art (FIGS. 3B, 3C) with an illustrative embodiment of our invention (FIGS. 3D, 3E)
Figure 3C:
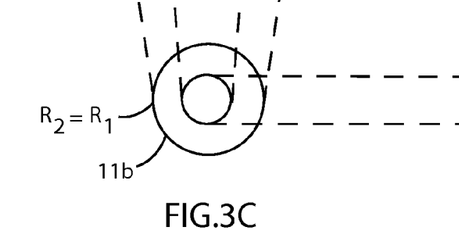
Figure 3D:
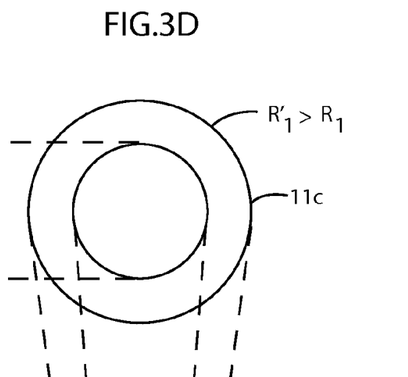
Figure 3E:
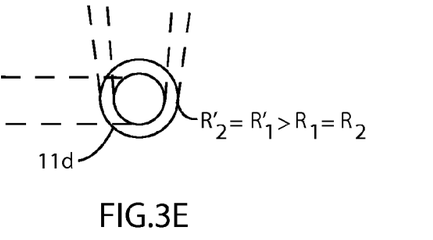

This inventive TFB coupler is further illustrated in FIGS. 3B-E, which depicts various cross-sections of an illustrative optical fiber before (FIGS. 3B, 3D) and after (FIGS. 3C, 3E) tapering. FIG. 3B shows fiber 11a (similar to fiber 31), which illustrates a typical fiber located in the first section 15 of a conventional TFB coupler shown in FIG. 1 and as located in first section 35 of our inventive TFB coupler, as shown in FIG. 3A. Using a conventional approach, each of the fibers 11a (FIG. 3B) of second section 15 would be undergo a tapering step T1. Tapering step T1 reduces the fiber cross sectional area, as shown by fiber 11b (FIG. 3B), but does not change the ratio (R) of the cross-sectional core area to the cross-sectional total area; that is, $R_2$ (defined as $A_{core2}/(A_{core2}+A_{clad2})$ for fibers 11b in second section 16) is equal to $R_1$ (defined as $A_{core1}/(A_{core1}+A_{clad1})$ for fibers 11a in first section 15). In contrast, using one embodiment of our inventive approach, before tapering, at least some of the fibers 11 (i.e., fiber 11c, FIG. 3D) within the second section 36 are subjected to a thinning step T2 wherein the cladding regions of fibers 11c are thinned, as shown in FIG. 3D. Thinning the cladding region of a fiber 11c increases its ratio of the cross-sectional core area to the cross-sectional total area; that is, $R_1'$, the ratio for the thinned fiber 11c of FIG. 3D, is greater than $R_1$, the ratio for the original fiber 11a of FIG. 3B. Thus, when the fibers 11c of the second section undergo tapering step T3, the cross-sectional area of each thinned fiber 11c is reduced, but, as with tapering step T1, step T2 does not change the ratio of the cross-sectional core area to the cross-sectional total area; that is, $R_2'$ (similarly defined to $R_2$ for fibers 11d in second section 36) is equal to $R_1'$ (similarly defined to $R_1$ for fibers 11c in first section 35). In a preferred embodiment of the first aspect of our invention, all of the fibers of the second section 36 have thinner cladding regions than those of the first section 35 before being tapered.

FIGS. 3A-E also contains the legends $TDR_{conv}$ and $TDR_{inv}$, which are the TDRs associated with tapering steps T1 and T2, respectively. In practice, these TDRs may or may not be equal to one another. Equations (4) and (5) illustrate a case where they are unequal.

It will be apparent to one skilled in the art that within the second section 36 the cladding regions of at least some (preferably all) of the fibers therein have smaller cross-sectional areas than the cross-sectional areas of the corresponding fibers within the first section 35. Likewise, it will be apparent that the cladding regions of the fibers illustratively have the shape of an annulus characterized by a radial thickness, and within the second section 36 the radial thicknesses of at least some (preferably all) of the cladding regions of the fibers therein are smaller than of the radial thicknesses of the corresponding cladding regions within the first section 35.

Thinning the cladding regions of at least some of the fibers in second section 16 raises the possibility that optical confinement of the optical modes propagating in those fibers may be insufficient, depending on the design details of the fibers and/or the performance specifications of the particular application. One aspect of the invention includes the fibers 11 being multimode fibers, where a majority of the light energy propagates in higher-order modes as compared to the fundamental mode. FIG. 6 illustrates one such higher-order mode, a second-order mode 6.3 that propagates in the core region 6.1 of fiber 6 but is inadequately confined by the thinned cladding region 6.2. (Other higher-order modes would also propagate in multimode fiber 11, but they are not depicted for clarity and simply of illustration.) In those cases where optical confinement is insufficient, we propose that the fiber bundle containing the thinned fibers be surrounded by a low-index, circumferential cladding region of the type illustrated in FIG. 4 and FIG. 5. By low index we mean that the index of the circumferential cladding region is less than that of the core region 6.1 of the fibers 6 within the bundle and is sufficiently low to confine light propagating in fibers 6.

Figure 4:
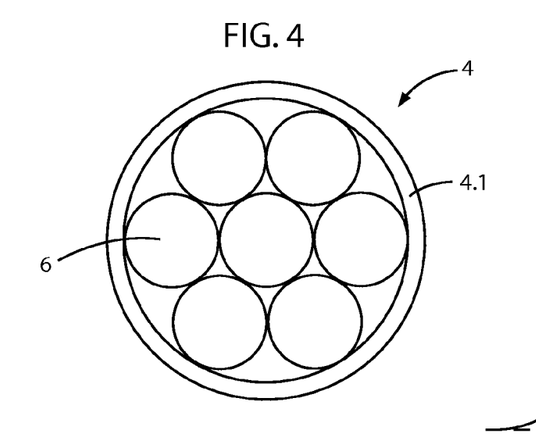
FIG. 4 depicts a schematic cross-section of an optical coupler in which a low-index cladding tube circumscribes the bundled fibers in accordance with another embodiment of our invention.

In FIG. 4, bundle 4 (within second TFB region 36) illustratively includes seven nested fibers 6 at least some of which have cladding regions that are too thin to provide adequate optical confinement of the propagating higher-order modes (HOMs; e.g., second-order mode 6.3, FIG. 6, which is intended to represent one or more HOMs in fiber 6). Bundle 4 is surrounded by a low-index glass tube 4.1, which serves as a low index cladding region. Tube 4.1, which circumscribes the outer fibers of the bundle 4, is put in place before any tapering step is executed, such as step T3 (FIG. 3). Thus, both tube 4.1 and fibers 6 are subject to tapering.

Figure 5:
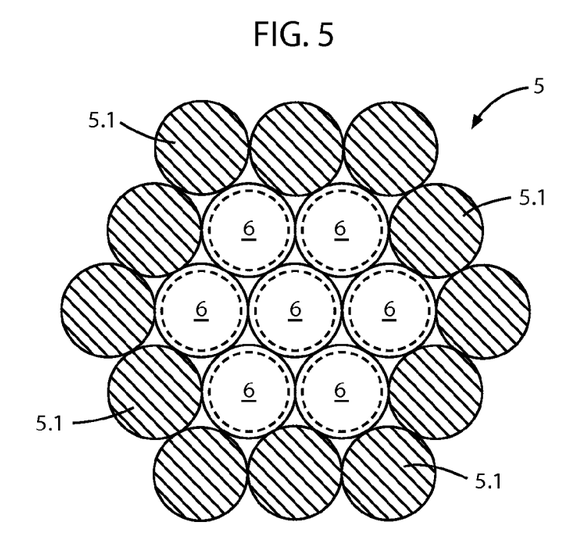
FIG. 5 depicts a schematic cross-section of an optical coupler in which a linear, hexagonal array of low-index cladding rods circumscribes the bundled fibers in accordance with another embodiment of our invention.
Figure 6:
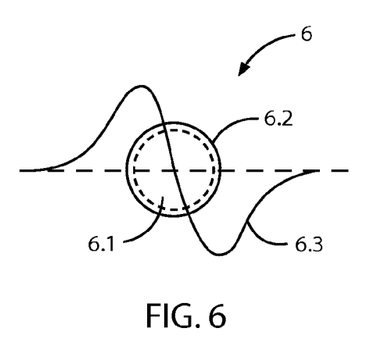
FIG. 6 is a schematic cross section of an illustrative fiber within the coupler of either FIG. 4 or FIG. 5 with an illustrative higher order mode overlying the fiber cross-section.

Similarly, in FIG. 5 bundle 5 (within second TFB region 16) illustratively includes seven nested fibers 6 at least some of which have cladding regions that are too thin to provide adequate optical confinement of the propagating HOMs (e.g., again represented by second-order mode 6.3, FIG. 6). Bundle 5 is surrounded illustratively by a linear, hexagonal array of adjacent, lower-index glass rods 5.1, which form a nested arrangement with the seven inner fibers 6. Rods 5.1, which circumscribe the outer fibers of the bundle 5 serve as a low-index cladding region. The array of rods is put in place before any tapering step is executed, such as step T3 (FIG. 3). Thus, both rods 5.1 and fibers 6 are subject to tapering.

Rods 5.1 may be made of low index glass or other material, or they may be optical fibers (including core and cladding regions that do not guide light in their core regions during operation of the bundle 5).

In each case, the low-index tube 4.1 or the low-index rods 5.1 provide sufficient optical confinement of the HOMs propagating in the bundles 4 and 5, respectively.

Tapered Fiber Bundle—Fabrication

TFB couplers and their fabrication are described in the DiGiovanni-Stentz and DiGiovanni-Tipton patents cited above as well as in the following patents, which are incorporated herein by reference: U.S. Pat. No. 6,397,636 issued to DiGiovanni and Fishteyn on Jun. 4, 2002 and U.S. Pat. No. 7,209,615 issued to Fishteyn on Apr. 24, 2007.

It will be apparent to those skilled in the art that this aspect of our invention embraces two fabrication approaches that are both improvements over techniques used to make conventional TFBs. In particular, our approaches allow the fabrication of TFBs in which (i) we taper the second section 16 to an overall diameter at the output port 12 that is the same as that attained by conventional techniques (i.e., we us the same TDR), but we are able to achieve a lower NA at the output port, or (ii) we taper the second section 16 to an overall diameter at the output port 12 that is smaller than that attained by conventional techniques (i.e., we use a smaller TDR), but we are able to do so with essentially no increase in NA at the output port.

In accordance with a second aspect of our invention, these known TFB coupler fabrication techniques are modified in the manner suggested above. In particular, one embodiment of our method of fabricating an optical coupler 10 (FIG. 1) comprises the steps of:

(a) providing a multiplicity of optical fibers 11, each fiber having a core region 11.1 and a cladding region 11.2 surrounding the core region, as shown in FIG. 2A, (b) arranging the multiplicity of fibers in a bundle (FIG. 2B) having a first axial section 15 and a tandem second axial section 16, as shown in FIG. 1, (c) configuring the fibers of the first and second sections to reduce the cladding of the fibers in the second section such that $D_{clad1} > D_{clad2}$ and more generally, $A_{clad1} > A_{clad2}$; and (d) tapering a portion of the second section of fibers. In one aspect of this embodiment, the tapered portion is less than the entire length of the second section. In another aspect, the tapered portion is the entire length of the second section.

The method may further comprise the step of fusing the fibers therein to one another. In another embodiment, the method includes the step of heating, without tapering, the fibers of the second section.

In another embodiment of the second aspect of our invention, the fibers of the first and second sections 15, 16 are continuous with no optical discontinuity (e.g., splice) therebetween, and configuring step (c) includes that step of reducing the thickness of the cladding regions of at least some of the fibers (FIGS. 3B, 3D) in the second section. In a preferred embodiment, configuring step (c) includes that step of reducing the thickness of the cladding regions of all of the fibers (11c, FIG. 3D) in the second section. Various techniques known to those skilled in the art can be used to effect thinning of the cladding regions. For example, the claddings of at least some (preferably all) of the fibers of the second section may be chemically etched or plasma etched to remove cladding region material. Preferably, cladding region material is removed uniformly around the fiber circumference. In one embodiment of configuring step (c), we have used hydrofluoric acid (HF) to remove (chemically etch) outer cladding material of multimode silica optical fibers within second section, as described below:

Experiment I

Thinner Fiber Claddings in the Second Section Configured by Etching Process

Multimode silica fibers with undoped cores and F-doped claddings were used in all cases described below. We compared the measured NA of an input fiber (105 μm core diameter, 125 μm cladding outside diameter, and 0.22 NA) to the output of a seven-fiber, multimode TFB of the type shown in FIGS. 1 and 2 but modified in accordance with this embodiment of our invention. The TFB was fabricated with a 10% TDR to reduce an initial diameter at interface 17 of 330 μm to a final diameter at interface 17 of 300 μm. Light was launched to fully-fill the NA of each fiber.

The NA of light in the 10% taper was measured to be approximately 0.02 larger than light in the input fiber (10% larger than the NA of the input fiber). This NA increase is consistent with that predicted by optical theory.

Since the NA increase of a TFB is due to light reflecting off of the core/cladding interface inside the tapered second section, the NA of this reflected light will increase in direct proportion to the TDR. This TFB had several design requirements: (i) to reduce the NA increase that results from tapering and (ii) to fit all seven of the nested fibers inside the 300 μm diameter core of the output fiber 19. To accomplish both of these competing design requirements, we used a hydrogen fluoride (HF) etching process to thin the claddings of each of the fibers in the second section prior to tapering. The aqueous HF solution ranged from 40% to 52% HF by volume, depending on the desired etch rate. Faster etch rates were achieved with higher HF concentrations.

The etching process included preparing a bath of the above-described HF solution and then dipping the ends of the fibers into the bath to a depth corresponding to the desired length of second section 16 (i.e., approximately the distance between interface 17 and output port 12). The fiber ends were kept immersed for a time period of a few 10s of seconds depending on how much cladding material was to be removed.

Etching silica fibers using an HF bath (etchant) is well known in art, as described, for example, in Fishteyn patent, supra. Equally well known is the need to manage the etch rates carefully by controlling such parameters as: the concentration of the etchant, the temperature of the etchant, the time that the fiber ends are exposed to the etchant, and the rate of dipping the fiber ends into the etchant.

We compared two TFBs: one in which the claddings of the fibers in the second section 16 were not etched vs. an otherwise identical TFB in which the fibers of the second section were etched to reduce their cladding thicknesses. As noted above, the outside diameter of the input fiber cladding was 125 μm. Therefore, the maximum outside diameter of the nested fibers was 375 μm, which prevented the nested fibers from fitting within the 300 μm diameter core of an output fiber. By HF etching to thin the claddings of each of the fibers in the second section from an outside diameter of 125 μm to 113 μm (maximum outside diameter of the nested fibers of 339 μm), followed by minimum tapering (about 10%), we were able to fit all seven fiber cores inside the 300 μm diameter of the output fiber with minimal NA increase (of about 0.02).

In another embodiment of the second aspect of our invention, configuring step (c) includes that steps of (c1) forming within the second section 16 a separate bundle of fibers at least some of which (11c, FIG. 3D) have thinner cladding regions (as-drawn, for example) than the fibers (11, FIG. 3B) of the first section 15, (c2) aligning the fibers of the first and second section with one another, and (c3) splicing the fibers of the second section to those of the first section. In a preferred embodiment, forming step (c1) includes that step of forming within the second region 16 a separate bundle of fibers all of which (11c, FIG. 3D) have thinner cladding regions (than the fibers (11, FIG. 3B)] of the first section and then performing steps (c2) and (c3) above. We have used this approach to demonstrate the efficacy of an illustrative embodiment of our invention as follows:

Experiment II

Thinner Fiber Claddings in Second Section Configured by Use of Thinner As-Drawn Fibers Multimode silica fibers with undoped cores and F-doped claddings were used in all cases described below. A result similar to that of Experiment I was achieved by forming the second section of fibers that, as drawn, had smaller diameters than the fibers of first section, but the core diameters were the same (105 µm) in both sections. These separate sections were fusion spliced to one another to form a TFB of the type shown in FIGS. 1 and 2 but modified in accordance with this embodiment of our invention. The second section, and only this section, was then tapered by techniques well known in the TFB art.

All fibers of the second section had a 105 µm diameter core, but had different outside diameter claddings (116 µm, or 111 µm).

The NA results were comparable to those of Experiment I.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, there may situations where, for example, our TFB needs to be matched to a considerably smaller utilization device (e.g., a device having a 200 µm diameter input port). In such cases it may be desirable to utilize, for example, a 300 µm diameter core output fiber, to use one of the previous embodiments of our invention to achieve a 300 µm diameter output port, to couple the 300 µm output port to one end of the output fiber, to taper the other end of the output fiber from 300 µm to 200 µm to match the input port of the utilization device, and to couple the tapered end to the input port of the utilization device.

We claim:

1. An optical fiber coupler comprising:
   a first axial section of a plurality of optical fibers wherein each optical fiber in the first axial section is configured to propagate light and at least two fibers in the plurality of optical fibers have a core with a diameter $D_{core1}$ and a cladding with a diameter $D_{clad1}$;
   a second axial section of a plurality of optical fibers, arranged in tandem with respect to the first axial section, wherein each optical fiber in the second axial section is configured to propagate light and at least two fibers in the plurality of optical fibers have a core with a diameter $D_{core2}$ and a cladding with a diameter $D_{clad2}$;
   wherein the cores of the at least two fibers in the first axial section are aligned with the cores of the at least two fibers in the second axial section,
   wherein a portion of the at least two optical fibers in the plurality of optical fibers of the second axial section have $D_{clad2}$ less than $D_{clad1}$ and $D_{core2}$ less than $D_{core1}$,
   wherein the optical fibers of the second axial section are bundled into a tapered length such that the reduced diameter cores in the at least two fibers in said portion of the second axial section are closer in proximity to each other than the cores in the at least two fibers in the first axial section, whereby an increase in numerical aperture of light propagating between an input end of the first axial section and an output end of the second axial section is suppressed, and light exiting the output end of the second axial section has higher brightness than if $D_{clad2}=D_{clad1}$.

2. The optical fiber coupler of claim 1, wherein the tapered length is an entire length of the portion.

3. The optical fiber coupler of claim 1, wherein the tapered length is less than an entire length of the portion.

4. The optical fiber coupler of claim 1 further comprising an output fiber connected to a tapered output end of the second axial section.

5. The optical fiber coupler of claim 1 wherein the fibers in the plurality of optical fibers of the first axial section and the fibers in the plurality of optical fibers of the second axial section are continuous with no optical discontinuity between the two sections.

6. The optical fiber coupler of claim 1 wherein each of the fibers in the plurality of optical fibers of the second axial section is aligned and optically coupled to a matching fiber in the plurality of optical fibers of the first axial section at an optical interface between the two sections.

7. The optical fiber coupler of claim 6 wherein the fibers between the first and second axial sections are coupled via fusion splicing.

8. The optical fiber coupler of claim 1 wherein the fibers in the first axial section comprise a centrally-disposed single mode fiber surrounded by a set of multimode fibers.

9. The optical fiber coupler of claim 1 wherein the fibers in the second axial section comprise a centrally-disposed single mode fiber surrounded by a set of multimode fibers.

10. The optical fiber coupler of claim 1 wherein $D_{clad2}$ being less than $D_{clad1}$ within the portion of the second axial section occurs along a same length for each of the at least two fibers in the second axial section.

11. A method for making an optical fiber coupler comprising the steps of:
    providing a first axial section of a plurality of optical fibers wherein each optical fiber in the first axial section is configured to propagate fight and at least two fibers in the plurality of optical fibers have a core with a diameter $D_{core1}$ and a cladding with a diameter $D_{clad1}$,
    arranging in tandem with respect to the first axial section, a second axial section of a plurality of optical fibers, wherein each optical fiber in the second axial section is configured to propagate light and at least two fibers in the plurality of optical fibers have a core with a diameter $D_{core2}$ and a cladding with a diameter $D_{clad2}$,
    aligning the cores of the at least two fibers in the first axial section with the cores of the at least two fibers in the second axial section,
    removing cladding from a portion of each of the at least two optical fibers in the plurality of optical fibers of the second axial section such that $D_{clad2}$ is less than $D_{clad1}$ within this portion;
    bundling the plurality of optical fibers in the portion of the second axial section where the cladding has been removed such that the cores in the at least two fibers in said portion are closer in proximity to each other than the cores in the at least two fibers in the first axial section, whereby an increase in numerical aperture of light propagating between an input end of the first axial section and an output end of the second axial section is suppressed and light exiting the output end of the second axial section has higher brightness than if $D_{clad2}=D_{clad1}$; and
    tapering the bundled portion of optical fibers in the second axial section such that $D_{clad2}$ is further reduced and $D_{core2}$ is less than $D_{core1}$ for each of the at least two optical fibers.

12. The method for making an optical fiber coupler of claim 11, further comprising the step of encasing the entire portion of the second section with a low index, circumferential cladding region prior to the step of tapering, wherein the circumferential cladding region has a refractive index less than a refractive index of the cores of the at least two fibers in the second axial section.

13. The method for making art optical fiber coupler of claim 12, wherein the cladding region is a low index glass tube.

14. The method for making an optical fiber coupler of claim 12, wherein the cladding region comprises a plurality of low index rods arranged to circumscribe the optical fibers in the bundled portion of the second axial section.

15. The method for making an optical fiber coupler of claim 11, wherein the fibers in the plurality of optical fibers of the first axial section and the fibers in the plurality of optical fibers of the second axial section are continuous with no optical discontinuity between the two sections.

16. The method for making an optical fiber of claim 15, wherein the step of removing cladding further comprises the step of etching away the cladding of the portion of the at least two optical fibers in the second axial section.

17. The method for making an optical fiber coupler of claim 11, wherein the optical fibers of the first axial section are separate from the optical fibers of the second axial section, the method further comprising the steps of:
    aligning each of the fibers in the plurality of optical fibers of the second axial section to a separate one of the fibers in the plurality of optical fibers of the first axial section at an optical interface between the two sections; and
    optically coupling each of the fibers in the second axial section to its associated and aligned fiber in the first axial section.

18. The method for making an optical fiber coupler of claim 17 wherein the fibers between the first and second axial sections are coupled via fusion splicing.

* * * * *